United States Patent [19]

Nonaka et al.

[11] Patent Number: 5,654,949
[45] Date of Patent: Aug. 5, 1997

[54] RECORDING MEDIUM REPRODUCING DEVICE

[75] Inventors: Yoshiya Nonaka; Kiyoshi Furukawa; Kazunori Matsuo; Shigetoshi Kato, all of Kawagoe, Japan

[73] Assignee: Pioneer Electronic Corporation, Tokyo, Japan

[21] Appl. No.: 681,380

[22] Filed: Jul. 23, 1996

[30] Foreign Application Priority Data

Jul. 25, 1995 [JP] Japan .................. 7-209185

[51] Int. Cl.⁶ .......................... G11B 7/00
[52] U.S. Cl. .......................... 369/60; 369/32
[58] Field of Search .................. 369/32, 60, 124, 369/54, 58, 47

[56] References Cited

U.S. PATENT DOCUMENTS 5,463,607  10/1995  Roth et al. .................. 369/60
5,471,450  11/1995  Yonemitsu et al. .................. 369/60

*Primary Examiner*—Nabil Hindi
*Attorney, Agent, or Firm*—Sughrue, Mion, Zinn, Macpeak & Seas

[57] ABSTRACT

A recording medium reproducing device comprises: reading means using a pickup to read data from a recording medium, and outputting the data thus read; memory control means for controlling the output data of the reading means to store the data in a memory; reproducing means for reading data from the memory and converting the data into a reproducing signal; and a microcomputer for controlling the reproducing means. In the reproducing device, the microcomputer varies a threshold value set for the memory, according to the time of absence or the frequency of absence of the output data of the reading means. Thus, the reproducing device eliminates the difficulty that the user feels unpleasant because of the frequent pause of sound reproduction.

5 Claims, 4 Drawing Sheets

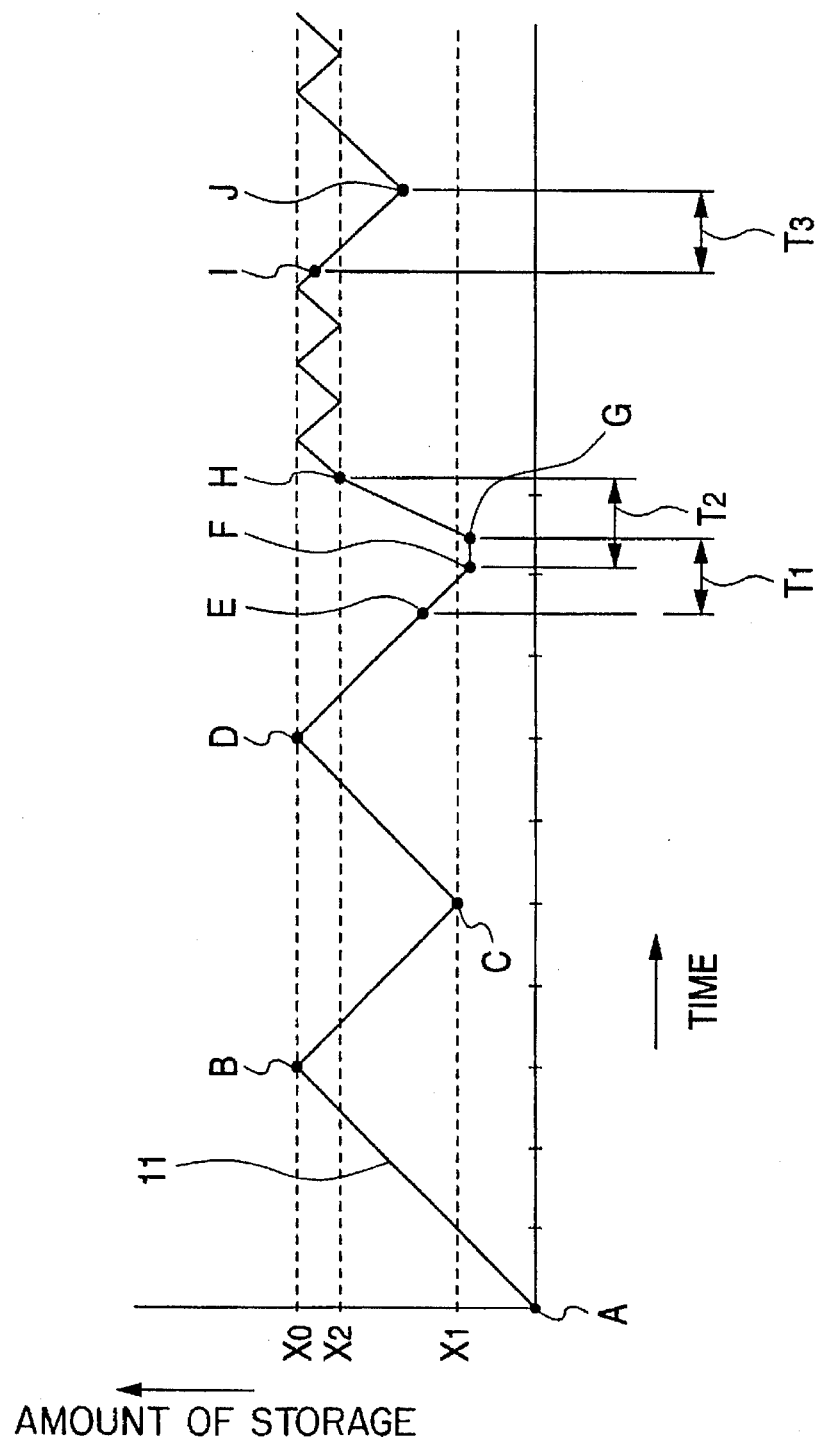

RECORDING MEDIUM REPRODUCING DEVICE

BACKGROUND OF THE INVENTION

This invention relates to a recording medium reproducing device which has a vibration-resisting function, such as a portable CD (compact disk) player and an automobile mount CD player.

A CD player mounted on an automobile (hereinafter referred to as "an automobile CD player", when applicable) is liable to be vibrated; that is, it suffers from so-called "sound skip (intermittent signal reproduction)" when the automobile is traveling. In order to overcome this difficulty, a CD player of this type has a vibration resisting function.

When a conventional mobile DC player having a vibration resisting function is operated, the spindle motor is rotated at a speed about twice as high as the standard reproduction speed of an ordinary CD player, while the pickup reads data from the CD, and the data thus read are stored in memory to a predetermined amount. Next, in the reproducing device, the micro-computer outputs the data at the standard reproduction speed of the CD player which have been stored in memory, and converts them into reproducing signals.

Hence, even in the case where the CD player is shocked or vibrated while the automobile is traveling, so that the pickup is shifted from the data track; that is, it cannot read data from the CD, the data which have been stored in memory are sequentially outputted. Therefore, in the case where the period of time which elapses from the time instant that the pickup is shifted from the track until it returns to the former address to start reading data again, is shorter than the time required for taking data out of the memory and reproducing them, the signal is reproduced smoothly, not being intermittent. On the other hand, the microcomputer has stored the position or address where the pickup is shifted. Hence, while the data stored in the memory are being reproduced, the pickup is moved back to the position where it has suspended reading data, to start reading data again. The data thus read are stored in the memory.

If summarized, in order to overcome the difficulty that signals are not continuously reproduced (hereinafter referred to as "reproduction jump" or "sound skip", when applicable) the conventional vibration-resistive mobile CD player employs the following method: When a reproduction start instruction is issued, the CD is rotated at a speed higher than the standard speed, so that the data transfer rate is higher than is required for reproducing signals; that is, after data have been stored to a predetermined amount, the signal reproduction is carried out.

However, the method suffers from the following difficulties: If the amount of data to be stored in the memory is large, the waiting time becomes long which elapses from the time instant that the reproduction start instruction is issued until the signal reproduction is effected. On the other hand, for instance in the case where, in a CD changer adapted to reproduce signals from a plurality of CDs one after another, there is a wait time which is not only the time required for exchanging a CD for another but also the time required for storing the data in memory which are necessary for reproduction. That is, whenever a CD is exchanged for another one, the wait time occurs, which may make the user unpleasant.

If, on the other hand, the amount of data to be stored in memory is small, then the following difficulty is involved: When, during reproduction, even slight vibration makes the pickup difficult to read data from the CD, the reproduction jump occurs. In this case, the sound reproduction is interrupted frequently, which also makes the user unpleasant.

SUMMARY OF THE INVENTION

Accordingly, an object of the invention is to eliminate the above-described difficulties accompanying a conventional recording-medium reproducing device.

More specifically, an object of the invention is to provide a recording-medium reproducing device in which sound reproduction is effected immediately when a disk reproduction start instruction is issued (there is no wait time), and in correspondence to mechanical vibrations applied to the device during reproduction, its vibration resistivity is enhanced, thereby to decrease the frequency of occurrence of the reproduction jump.

The foregoing object and other objects of the invention have been achieved by the provision of a recording medium reproducing device comprising: a reading unit using a pickup to read data from a recording medium, and outputting the data thus read; a memory controller for controlling the output signal of the reading means to store it in a memory; a reproducing unit for retrieving data from the memory and converting the data into a reproducing signal; and a microcomputer for controlling the reproducing unit, in which, according to the invention, the microcomputer varies a threshold value set for the memory, according to the time of interrupt or the frequency of interrupt of output data of the reading unit.

In the recording medium reproducing device thus organized, during reproduction, an operation of reading data from the recording medium and an operation of storing data in the memory are started at the same time, and the microcomputer operates so that the data reading speed of the reading means is higher than the data reproducing speed of the reproducing unit, whereby a predetermined amount of data are held stored in the memory. That is, even when, during reproduction, the reading unit fails to read data, the threshold value set for the memory is varied according to the time of interrupt or the frequency of interrupt of output data of the reading unit. Hence, immediately when the reproduction start instruction is issued, sound is reproduced (no wait time), and in correspondence to mechanical vibrations applied to the device during reproduction, its vibration resistivity is enhanced, thereby to decrease the frequency of occurrence of sound skip.

The nature, utility and principle of the invention will be more clearly understood from the following detailed description and the appended claim when read in conjunction with the accompanying drawings.

BRIEF DESCRIPTION OF THE DRAWINGS

In the accompanying drawings:

FIG. 4 is a graphical representation indicating how the amount of digital data in a memory is increased and decreased when, after receiving an optical disk reproduction instruction, the recording medium reproducing device outputs a reproduction signal.

DETAILED DESCRIPTION OF THE PREFERRED EMBODIMENTS

A recording-medium reproducing device, which constitutes a preferred embodiment of the invention, will be described with reference to the accompanying drawings.

Figure 1:
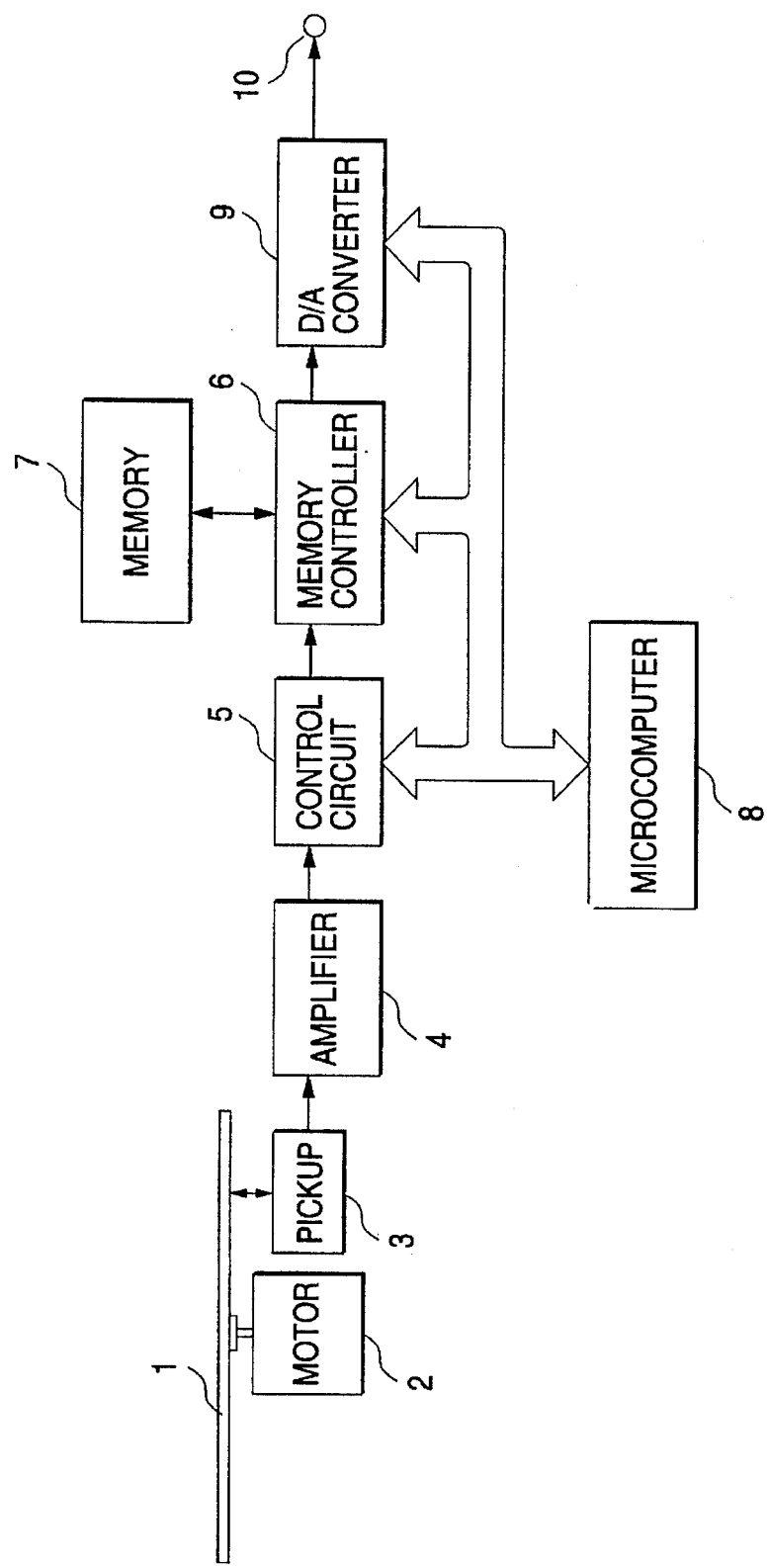
FIG. 1 is a block diagram showing the arrangement of a recording medium reproducing device, which constitutes a preferred embodiment.

The recording-medium reproducing device, as shown in FIG. 1, comprises an optical disk 1 such as a CD (compact disk) in the surface of which pits bearing data are arranged on spiral or concentric-circular patterns; and an electric motor 2. The motor 2 is so rotated that, during reproduction of signals from the disk, the light beam of a pickup 3 adapted to read pits scans the disk in the direction of rotation of the disk at a speed twice as high as the standard reproduction speed of the disk.

The pickup 3 applies a light beam to the pits of the optical disk 1 to obtain a reflection light beam to optically read data produced by the pits, and applies the data thus read to an amplifier 4. In the amplifier 4, the data thus received are converted into electrical signals which are amplified into RF signals. The RF signals are applied to a control circuit 5.

In the control circuit 5, the RF signals are converted into digital data, which are applied to a microcomputer 8 and a vibration-resistive memory controller 6. The microcomputer 8 controls the control circuit 5, the memory controller 6, and a D/A (digital-to-analog) converter 9. On the other hand, in response to an instruction from the microcomputer 8, the memory controller 6 operates to supply the digital data formed by the control circuit 5 to a memory 7, to store them in the latter 7.

In response to an instruction from the microcomputer 8, the memory controller 6 retrieves digital data from the memory 7 at a speed equal to the standard reproduction speed of the disk and supplies them to the D/A converter 9 sequentially. The D/A converter 9 converts the digital data into reproducing signals, and outputs them through an outer terminal 10 at the standard reproduction speed of the disk.

Now, the control operation of the micro-computer 8 in the case where the reproducing device reads data from an optical disk, will be described with reference to FIG. 2.

As was described above, FIG. 2 is a flow chart for a description of the operations of the micro-computer 8 which controls the operations of the reproducing device until data are read from the disk in response to an optical disk reproduction start instruction.

Upon start of the reproducing device, the microcomputer operates to turn on all servo elements which are necessary for the data reading operation of the reproducing device (Step S1). Next, in Step S2, the light beam of the pickup 3 is applied to data record track on the disk to search addresses slightly before a predetermined address.

Thereafter, Step S3 is effected. In Step S3, addresses are sequentially read by scanning the tracks with the light beam of the pickup until a predetermined address is detected.

After the detection of the predetermined address, Step S4 is effected in which the control circuit 5 is instructed to sequentially read the data at a speed twice as high as the standard reproduction speed. After the control circuit 5 has read the data, Step S5 is effected. In Step S5, the internal address pointer of the micro-computer is renewed; that is, control is so made that the memory controller 6 operates to renew the data in the memory 7 to store the data. Upon renewal of the data in the memory 7, Step S6 is effected.

On the other hand, in the case when, during data-reading, the pickup is caused to jump the track due to external vibration or shock; that is, when it is out of servo control, Step S1 is effected again so as to turn on all the servo elements, and then Step S2 is effected so that addresses are searched which are slightly before the address which has been stored immediately before the track jump, and Steps S3, S4 and S5 are effected all over again. Thereafter, Step S6 is effected.

In Step S6, the microcomputer 8 determines whether or not the amount of data stored in the memory has reached the data storage capacity of the memory 7. When the amount of data stored in the memory has not reach the data storage capacity of the memory 7 yet, Step S7 is effected; that is, the micro-computer waits for the issue of the next address signal from the control circuit 5. Upon detection of that next address signal, Step S4 is effected; that is, the microcomputer 8 issues an instruction so that the control circuit 5 reads data sequentially.

When, in Step S6, it is determined that the amount of data stored in the memory 7 has reached the data storage capacity of the memory, Step S8 is effected; that is, the microcomputer 8 operates to cause the memory 7 to maintain the address which has been stored last, and to place the pickup in the pause state, thereby to suspend the reading of the last address.

In Step S8, the vibration-resistive memory controller 6 does not supply the data to the memory 7, which are produced by the control circuit 5. However, the data which have been stored in the memory 7 are sequentially supplied to the D/A converter 9 at a speed equal to the standard reproduction speed of the disk in response to an instruction from the micro-computer 8, and therefore the amount of data stored in the memory 7 is gradually decreased.

On the other hand, a predetermined threshold value has been stored in the micro-computer 8. Hence, Step S9 is effected. In Step S9, it is determined whether or not the amount of data in the memory 7, being gradually decreased, has reached the threshold value set for the micro-computer 8. When it is determined that the amount of data in the memory 7 has reached the threshold value, Step S10 is effected to activate the pickup again, and Step S2 is effected so that addresses slightly before the address stored in Step 8 are searched. And Steps S3, S4 and so forth are effected all over again.

The terminal "threshold value" as used herein is intended to mean an index value representing the amount of data stored in the memory 7. The threshold value is set and stored in the microcomputer 8 as follows: That is, the memory controller 6 detects the address point of read data which is stored in the memory 7, and the address point of reproduction data read out of the memory, and calculates the difference between those address points thus detected. The difference thus calculated is set and stored, as a value corresponding to the amount of data stored in the memory, in the microcomputer 8.

The threshold value can be changed by the microcomputer 8 in correspondence to a disk exchanging operation (described later), the lack of information during data reading, and so forth.

Thus, in response to the optical disk reproduction start instruction, the disk's data have been read and processed.

Now, the control operations of the microcomputer 8 in the case where the reproducing device reproduces the data of the optical disk, will be described with reference to FIG. 3.

As was described before, FIG. 3 is a flow chart for a description of the operations of the microcomputer 8 which controls the operations of the reproducing device until the data of the disk are reproduced in response to an optical disk reproduction start instruction.

First, when the microcomputer 8 receives the optical disk reproduction start instruction, Step S21 is effected (FIG. 3) to determined whether or not the amount of data stored in the memory 7 has reached a predetermined threshold value. When it is determined the amount of data in the memory has reached the threshold value, Step S22 is effected. In Step S22, the vibration resistive memory controller 6 starts reading data from the memory 7, and supplies them to the D/A converter 9 successively at a speed equal to the standard reproduction speed of the disk. In addition, in Step S22, the pickup performs its data reading operation.

In Step S21, the threshold value has been set to "0" in advance. For instance in the case where the pickup reads data from a new disk, both the amount of data stored in the memory 7 and the threshold value are "0", and therefore the microcomputer 8 determines that the amount of data in the memory 7 has reached the threshold value. As a result, Step S22 is effected. It should be noted that, in Step S22, the microcomputer 8 changes the threshold value from "0" to a predetermined initial value; that is, it sets an initial threshold value.

Next, Step S23 is effected, so that the microcomputer 8 operates so that the address points of data which are sequentially read out in Step S22 are renewed and stored, thereby to calculate a disk reproduction time, music number, music passed time, etc. which are to be displayed.

Thereafter, Step S24 is effected, so that the amount of data left in the memory 7 is compared with the initial threshold value. In the case where the pickup 3 is placed in the pause state (cf. Step S8 in FIG. 2) thus suspending the address reading operation, or in the case where the pickup is caused to jump the track by external vibration or shock; that is, where it is out of servo control, the amount of data left in the memory 7 is gradually decreased being read out by the memory controller 6. Hence, the microcomputer 8 detects it from the difference between the address point of read data and the address point of reproduction data which are detected and operated by the memory controller 6 whether or not the amount of data stored in the memory 7 is smaller than the initial threshold value. Where it is determined the amount of data in the memory 7 is smaller than the initial threshold value, Step S25 is effected, so that the reading of data from the memory by the memory controller is suspended, while the output of the D/A converter 9 is muted. In the case where, although the pickup 3 is caused to jump the track by external vibration or shock for a short time, the amount of data in the memory 7 is not smaller than the initial threshold value, Step 23 is effected again, and the data reading operation is continued.

Next, Step S26 is effected, so that the threshold value is renewed. That is, the threshold value is increased as much as a predetermined value. The resultant threshold value together with the initial value is stored, and Step S21 is effected.

When, in Step S21, the amount of data in the memory 7 exceeds the new threshold value, Step S22 is effected. There-after, the above-described Steps S23, S24 and so forth are effected repeatedly.

Thus, in response to the data reproduction start instruction of the optical disk, the data of the disk have been reproduced.

The operation of the recording medium reproducing device which, in response to an optical disk data reproduction instruction, outputs reproducing signals while storing data in the memory, will be described with reference to FIG. 4.

As is seen from FIG. 4, when the reproducing device of the invention outputs reproducing signals in response to an optical disk data reproduction instruction, the amount of digital data stored in the memory is varied (increased and decreased).

In FIG. 4, reference numeral 11 designates an-amount-of-data-left-in-memory characteristic. The vertical axis represents amounts of digital data stored in the memory 7, while the horizontal axis represents time instants (the lapse of time).

In FIG. 4, at the point A, the reproducing device receives an optical disk data reproduction instruction, whereupon the microcomputer 8 rotates the motor 2 at a speed twice as high as the standard reproduction speed of the optical disk. Hence, the pickup 3 reads pits at a speed twice as high as the standard reproduction speed of the optical disk to provide the RF signal, which is applied through the control circuit 5 to the vibration resistive memory controller 6. The memory controller 6 sequentially supplies the digital data thus received to the memory 7 at a speed twice as high as the standard reproduction speed of the optical disk, while reads the digital data from the memory 7 at a speed equal to the standard reproduction speed of the optical disk, and supplies them to the D/A converter 9 sequentially. In the D/A converter 9, the digital data thus received are converted into reproducing signals, which is outputted through the output terminal 10 at the standard reproduction speed of the disk. Hence, the amount of digital data in the memory 7 is proportionally increased (with the lapse of time) at the standard reproduction speed of the optical disk.

The memory 7 is made up of a DRAM (dynamic random access memory) of 4 Mbit, and has a data storage capacity corresponding to three (3) seconds in maximum (X0 in FIG. 4) with the standard reproduction speed of an optical disk. Hence, when the point B is reached in FIG. 4, the memory 7 is saturated. Therefore, the vibration resistive memory controller 6 detects when the capacity of the memory 7 reaches X0, and sets up a flag for the microcomputer 8. The latter 8 detects the flag, and stores the address when the memory is saturated, and places the pickup in pause state; i.e., suspends the pit reading operation.

Hence, after the point B in FIG. 4, the vibration resistive memory controller 6 sequentially reads the digital data out of the memory 7 at a speed equal to the standard reproduction speed of the optical disk. The data thus read are supplied to the D/A converter 9, where they are converted into reproducing signals, which are outputted through the output terminal 10 at the standard reproduction speed of the disk. Hence, the amount of digital data in the memory is proportionally decreased (with the lapse of time) at the standard reproduction speed of the optical disk.

During reproduction, the memory controller 6 detects the amount of digital data left in the memory 7. And when the amount of digital data in the memory 7, being gradually decreased, reaches a value corresponding to one second (X1 in FIG. 4) with the standard reproduction speed of the optical disk, the memory controller 6 sets up a flag for the microcomputer. Hence, at the point C in FIG. 4, the microcomputer 8 detects the flag, and activates the pickup 3; i.e., returns it to the address where the pit reading operation has suspended, to perform the pit reading operation again. Thus, in FIG. 4, during a period of time between the points C and D, the digital data in the memory 7 are processed as follows: That is, similarly as in the digital data processing operation during the period of from the point A to the point B, with the aid of the vibration resistive memory controller 6 the digital data are sequentially read out of the memory at speed equal to the standard reproduction speed of the optical disk while being proportionally increased (with the lapse of time). In FIG. 4, X1 represents the amount of data stored in the memory 7 which corresponds to the initial threshold value in Step S24 in FIG. 3.

As was described above, the recording medium reproducing device outputs reproducing signals at the standard reproduction speed while changing (increasing and decreasing) the amount of data in the memory 7.

Now, the case will be described in which the pickup of the reproducing device starts reading data at the point A in FIG. 4, and is caused to jump the track by external vibration or shock at the point E, and after a period of time T1 (i.e., at the point G) the pickup returns to the address from which it has jumped, and starts reading data.

Figure 3:
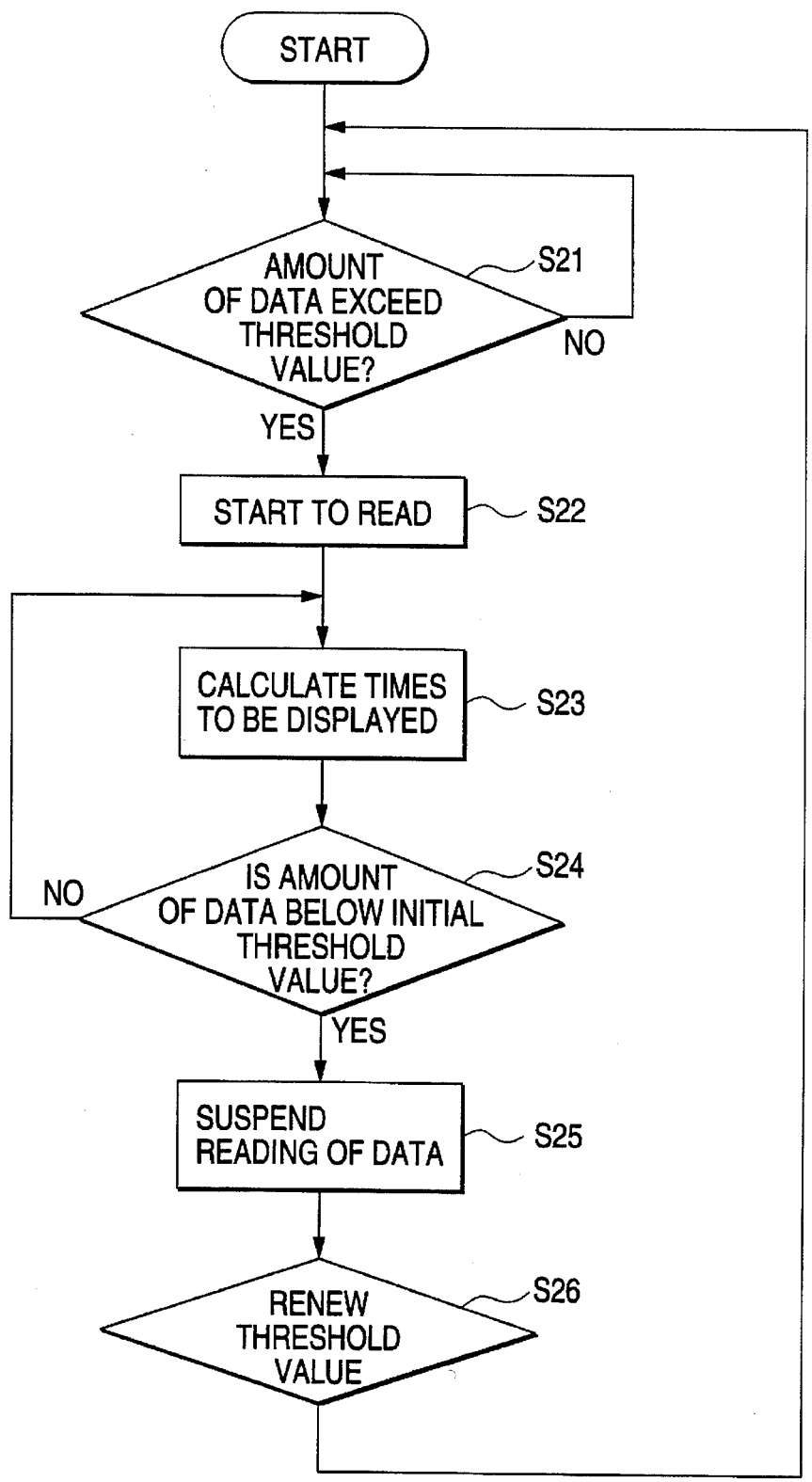
FIG. 3 is a flow chart for a description of the operations of the microcomputer which controls the operation of the reproducing device until the data read from the disk are reproduced in response to an optical disk reproduction start instruction.

When the pickup is caused to jump the track at the point E in FIG. 4, the microcomputer 8 performs the operation of Step S24 in FIG. 3; that is, the amount of data left in the memory 7 is compared with the predetermined threshold value X1. In the case of FIG. 4, at the point E, it is not smaller than the threshold value X1, and therefore the microcomputer continues the data read operation until the point F is reached where the amount of data is smaller by a predetermined value than the threshold value X1. Next, the microcomputer 8 performs the operation of Step S25 in FIG. 3; that is, the reading of data from the memory by the memory controller is suspended. And Step S26 is effected, so that the threshold value is set to X2 which is larger by a predetermined value than X1.

In Step S25, the data reading operation is suspended, and therefore the amount of data left in the memory is maintained unchanged for a period of time between the points F and G. However, when the pickup starts the data reading operation again at the point G, the amount of data in the memory 7 is increased at a speed twice as high as the memory data increase speed which is effected for a period of time between the points A and B. Next, the microcomputer 8 performs the operation of Step S21; that is, it determines whether or not the amount of data in the memory 7 exceeds the threshold value X2 set up before. At the point H, the amount of data in the memory 7 exceeds the threshold value X2, and therefore the microcomputer 8 causes the pickup to start the data reading operation again. Hence, for the period of time T2 between the points F and H, no data reading operation is carried out, and therefore no reproducing output is provided.

Figure 2:
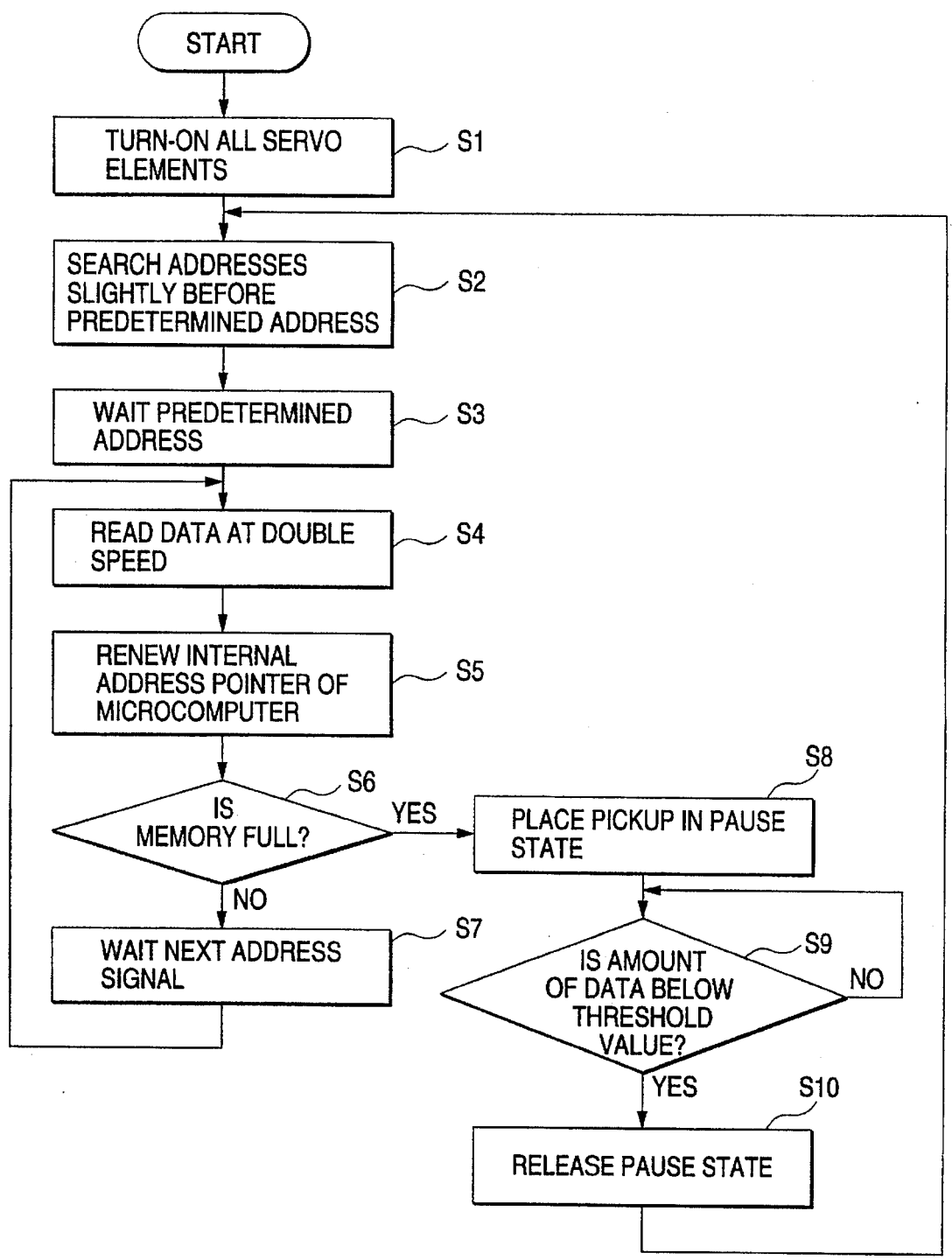
FIG. 2 is a flow chart for a description of the operations of a microcomputer which controls the operation of the reproducing device until data are read from a disk in response to an optical disk reproduction start instruction.

When the amount of data in the memory 7 exceeds the threshold value X2, the microcomputer 8 performs the operation of step S22 in FIG. 3; that is, the amount of data in the memory 7 is increased at a speed equal to the memory data increase speed, and the remaining Steps in FIG. 2 are carried out. Thus, the amount of data in the memory 7 is repeatedly changed (increased and decreased) between the maximum value X0 and the threshold value X2.

Now, the case will be described in which at the point I the pickup is caused to jump the track by external vibration or shock, and in a period of time T3 (i.e., at the point J) the pickup returns to the address from which it has jumped, and starts reading data.

When, at the point I in FIG. 4, the pickup is caused to jump the track, the microcomputer 8 performs the operation of Step S24 in FIG. 3; that is, the amount of data left in the memory 7 is compared with the initial threshold value X1. In the case of FIG. 4, at the point J the amount of data in the memory 7 is not smaller than the threshold value X1, and therefore the data reading operation is continued.

When the point J is reached, the pickup starts the data reading operation again, so that the amount of data in the memory 7 is increased. Next, the microcomputer performs the operations of the remaining Steps in FIG. 2 while continuing the data reading operation, so that the amount of data in the memory 7 is repeatedly increased and decreased between the maximum value X0 and the threshold value X2.

When, as was described above, the pickup cannot read data from the disk for the period of time T1, the microcomputer 8 sets the threshold value from X1 to X2, so that the amount of data in the memory 7 is increased while the data reading operation is continued. Hence, with the device of the invention, the occurrence of sound skip is decreased in frequency.

In the above-described embodiment, whenever a sound skip occurs, the microcomputer sets up a new threshold value; however, the invention is not limited thereto or thereby. That is, a new threshold value may be set up only when the amount of data stored in the memory becomes smaller than the initial threshold value X1 because the pickup is caused to jump the track frequently during a certain period of time. With the method, too, the occurrence of sound skip is decreased in frequency.

In the recording medium reproducing device thus organized, during reproduction, an operation of reading data from the recording medium and an operation of storing data in the memory are started at the same time, and the microcomputer operates so that the data reading speed of the reading means is higher than the data reproducing speed of the reproducing means, whereby a predetermined amount of data are held stored in the memory. That is, even when, during reproduction, the reading means fails to read data, the threshold value set for the memory is varied according to the time of absence or the frequency of absence of output data of the reading means. Hence, immediately when the reproduction start instruction is issued, sound is reproduced (no wait time), and in correspondence to mechanical vibrations applied to the device during reproduction, its vibration resistivity is enhanced, thereby to decrease the frequency of occurrence of sound skip. Hence, the device is free from the difficulty that the user feels unpleasant because of the frequent pause of sound reproduction.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A recording medium reproducing device comprising:
   reading means for reading data from a recording medium to output said data thus read, said reading means including a pickup;
   memory means for storing said data read by said reading means;
   memory control means for controlling said data read by said reading means to store in said memory;
   reproducing means for retrieving data from said memory and converting said data into a reproducing signal, and outputting said reproducing signal; and a microcomputer for controlling said memory control means and said reproducing means, said microcomputer varies a threshold value set for said memory according to one of a time period of interrupt and a frequency of interrupt of said data of said reading means.

2. A recording medium reproducing device as claimed in claim 1, wherein said reading means read said data from a compact disk as said recording medium at a double speed of a standard reproduction speed of the compact disk.

3. A recording medium reproducing device as claimed in claim 2, wherein said memory control means the data to said memory at the double speed of the standard reproduction speed of the compact disk, while retrieves data from said memory at a speed equal to the standard reproduction speed of the compact disk.

4. A recording medium reproducing device as claimed in claim 3, wherein said microcomputer places the reading means in pause state when an amount of the data stored in said memory reaches a capacity of said memory, while said microcomputer places the reading means in activate state to read the compact disk again when an amount of data stored in said memory becomes below the threshold value.

5. A recording medium reproducing device as claimed in claim 4, wherein said threshold value is renewed to a greater value when a track jump is caused by externally applied shock or vibration.

\* \* \* \* \*